Patented Mar. 2, 1954

2,671,025

UNITED STATES PATENT OFFICE 2,671,025

DAIRY PRODUCT AND PROCESS

Azniv D. Maissian, Philadelphia, Pa.

No Drawing. Application June 9, 1951,
Serial No. 230,839

4 Claims. (Cl. 99—55)

The object of the invention is to provide improvements in dairy products, and more especially in a precooked product having exceptional qualities of nutrition and taste.

More specifically, another object is to provide a product that is adapted for preparation at low cost, and which can be delivered through stores and/or by door-to-door delivery with a relatively low degree of refrigeration and small risk of spoilage.

A further object is to provide a product of this type, which as a delicacy is ready for use and is characterized by a substantially high vitamin content, and one by-product of which is especially adapted for the feeding of infants and as a part of reducing diets.

Still another object is to provide a precooked dairy product that may be whipped and served in a manner similar to whipped cream, while if preferred it is at all times ready for use, without further treatment, in association with various flavors, honey, syrup, fruit, cereals, pastry and many other well known and widely used foodstuffs.

In the preparation of this new product either or both raw and pasteurized whole milk and light cream may be used, and in the preferred method of production of a small quantity, for example, two teaspoons of Cream of Wheat or its substantial equivalent form of comminuted cereal is first roasted in combination with a small amount of butter of approximately three grams. One quart of either raw or pasteurized milk and one pint of either raw or pasteurized cream are boiled for approximately three minutes in combination with the roasted cereal, after which the mixture is poured into a suitable vessel as from a height of about fifteen inches, or similarly aerated by any other suitable method, said vessel being held at or near the boiling temperature by means of the water bath, and the contents repoured if necessary, or otherwise aerated for three minutes, or as long as may be required in order to lighten its texture to the desired degree, after which the product of this stage is simmered at low temperature for about two hours.

The product at this stage is cooled slowly for a period of about one-half hour or thereabouts, when it is refrigerated for a twenty-four hour period, during which time the cream content rises and solidifies. Upon separating the edges of the solidified top layer from the sides of the vessel the liquid phase is carefully drained off, and the remaining portion inverted into a suitable vessel and refrigerated at a temperature and degree of humidity such as will evaporate the residual free moisture from the upper surface when inverted. The resulting product may then be folded or left flat and cut for serving, or otherwise cut and shaped, if desired, for suitable packaging and distribution or storage.

Instead of roasting the Cream of Wheat, this or other suitable cereal ingredient may be used raw, in which case the product will be similar to that hereinbefore described except for a slightly different taste, which some persons may prefer. Or, instead of Cream of Wheat, substantially the same proportion of rice may be used, and other cereals if desired, while a very palatable product may be obtained without the use of either of the cereals mentioned, or in fact any others in lieu thereof.

As to the liquid phase, which in the process described is drained from the more solid phase, this may be used in conjunction with an additional batch of Cream of Wheat and/or rice, or other suitable cereal in the roasted form first above described, and served without further treatment and either sweetened or unsweetened. Or one or more of the same cereals may be added to the liquid phase and boiled for approximately fifteen minutes, and then cooled and served, or served hot if preferred and likewise sweetened or unsweetened.

Having thus described my invention, what I claim and desire to protect by Letters Patent of the United States is:

1. The process of preparing a substantially solid dairy product, which consists in roasting approximately two teaspoons of comminuted cereal with approximately three grams of butter, boiling approximately one quart of whole milk and one pint of cream in combination with said cereal for a period of approximately three minutes, aerating the resulting mixture while held at the temperature of the water bath, simmering the aerated mixture at low temperature for approximately two hours, cooling the mass for about one-half hour while the solid contents rise and solidify, refrigerating for approximately twenty-four hours, draining off the liquid phase, inverting the solid phase, and evaporating by refrigeration the free moisture from the previous under surface of the mass.

2. The product produced by the process set forth in claim 1.

3. The process of preparing a substantially solid dairy product, which consists in roasting a relatively small portion of comminuted cereal with butter, boiling approximately three pints of cream-enriched whole milk with said cereal for a period of approximately three minutes, aerating the mixture while held at the temperature of the water bath, simmering the aerated mixture at a low heat, cooling the mass slowly while the solid phase rises and solidifies, refrigerating for approximately twenty-four hours, draining off the liquid phase, inverting the solid phase, and evaporating by refrigeration the free moisture from the previous under surface of the mass.

4. The product produced by the process set forth in claim 3.

AZNIV D. MAISSIAN.

References Cited in the file of this patent

UNITED STATES PATENTS

| Number | Name | Date |
|---|---|---|
| 1,426,006 | Polak | Aug. 15, 1922 |
| 1,631,287 | Potmaker | June 7, 1927 |
| 1,990,329 | Johnson et al. | Feb. 5, 1935 |
| 2,314,459 | Salzburg | Mar. 23, 1943 |

OTHER REFERENCES

Ser. No. 395,359½, Antwerp et al. (A. P. C.), published May 4, 1943.